(12) United States Patent
Kulkarni et al.

(10) Patent No.: US 9,442,672 B2
(45) Date of Patent: Sep. 13, 2016

(54) REPLICATING DATA ACROSS CONTROLLERS

(71) Applicant: International Business Machines Corporation, Armonk, NY (US)

(72) Inventors: Janmejay S. Kulkarni, Mumbai (IN); Sapan J. Maniyar, Pune (IN); Sarvesh S. Patel, Nashik (IN); Subhojit Roy, Pune (IN)

(73) Assignee: GLOBALFOUNDRIES INC., Grand Cayman (KY)

( * ) Notice: Subject to any disclaimer, the term of this patent is extended or adjusted under 35 U.S.C. 154(b) by 340 days.

(21) Appl. No.: 14/075,037

(22) Filed: Nov. 8, 2013

(65) Prior Publication Data

US 2015/0134923 A1 May 14, 2015

(51) Int. Cl.
*G06F 3/06* (2006.01)

(52) U.S. Cl.
CPC ............... *G06F 3/065* (2013.01); *G06F 3/067* (2013.01); *G06F 3/0619* (2013.01)

(58) Field of Classification Search
None
See application file for complete search history.

(56) References Cited

U.S. PATENT DOCUMENTS

| | | | | |
|---|---|---|---|---|
| 6,070,251 | A * | 5/2000 | Chong | G06F 11/2097 714/12 |
| 6,601,187 | B1 * | 7/2003 | Sicola | G06F 11/2071 711/162 |
| 7,181,578 | B1 | 2/2007 | Guha et al. | |
| 7,774,548 | B2 | 8/2010 | Rao et al. | |
| 7,949,638 | B1 | 5/2011 | Goodson et al. | |
| 8,166,196 | B2 | 4/2012 | Nidumolu et al. | |
| 2005/0102479 | A1 * | 5/2005 | Innan | G06F 3/0607 711/162 |
| 2009/0259816 | A1 | 10/2009 | Sharma et al. | |
| 2012/0260127 | A1 | 10/2012 | Jibbe et al. | |

OTHER PUBLICATIONS

Brocade Communications Systems, Inc., "SAN Design and Best Practices", version 2.1, Copyright © 2007.
Dharma et al, "Networking for Storage Virtualization and EMC RecoverPoint", version 4.0, EMC Corporation, Copyright © 2011.
Hewlett-Packard Development Company, L.P., "Performance analysis of the HP StorageWorks Enterprise Virtual Array storage systems using HP StorageWorks Command View EVAPerf", Copyright © 2005 Hewlett-Packard Development Company, L.P.

\* cited by examiner

*Primary Examiner* — Idriss N Alrobaye
*Assistant Examiner* — Dayton Lewis-Taylor
(74) *Attorney, Agent, or Firm* — Michael Lestrange; Andrew M. Calderon; Roberts Mlotkowski Safran Cole & Calderon, P.C.

(57) ABSTRACT

In a method for replicating data, a first controller receives a request to write data from a device. The first controller communicates with a second controller to obtain information necessary for the second controller to receive the data. The first controller determines settings that allow for the first controller and the second controller to each receive the data using the information necessary for the second controller to receive the data. The first controller sends the settings that allow for the first controller and the second controller to each receive the data to the device. The first controller receives the data sent from the device to the first controller and the second controller based on the settings that allow for the first controller and the second to each receive the data.

17 Claims, 4 Drawing Sheets

REPLICATING DATA ACROSS CONTROLLERS

FIELD OF THE INVENTION

The present invention relates generally to the field of storage area networks (SAN), and more particularly to data replication and cache mirroring on multiple controllers in SAN virtualization solutions.

BACKGROUND OF THE INVENTION

A storage area network (SAN) is a dedicated network that provides access to consolidated, block level data storage. SANs are primarily used to make storage devices accessible to servers so that the devices appear like locally attached devices to the operating system. A SAN typically has its own network of storage devices that are generally not accessible through the local area network by other devices.

A SAN switch is typically a fibre channel switch that allows for the creation of switched fabric, where network nodes connect with each other via one or more network switches.

Storage virtualization uses virtualization concepts as a tool to enable better functionality and more advanced features within and across storage systems. SAN virtualization solutions provide high availability and redundancy by using a clustered system consisting of multiple controllers. These controllers may provide a caching mechanism to speed up application input/output (I/O). In systems that employ cache mirroring, application writes are acknowledged after replicating the write data to alternate controller caches. By employing cache mirroring, a system may protect cached data from controller failures.

SUMMARY

Aspects of an embodiment of the present invention disclose a method, computer program product, and computing system for replicating data. A first controller receives a request to write data from a device. The first controller communicates with a second controller to obtain information necessary for the second controller to receive the data. The first controller determines settings that allow for the first controller and the second controller to each receive the data using the information necessary for the second controller to receive the data. The first controller sends the settings that allow for the first controller and the second controller to each receive the data to the device. The first controller receives the data sent from the device to the first controller and the second controller based on the settings that allow for the first controller and the second to each receive the data.

DETAILED DESCRIPTION

Figure 1:
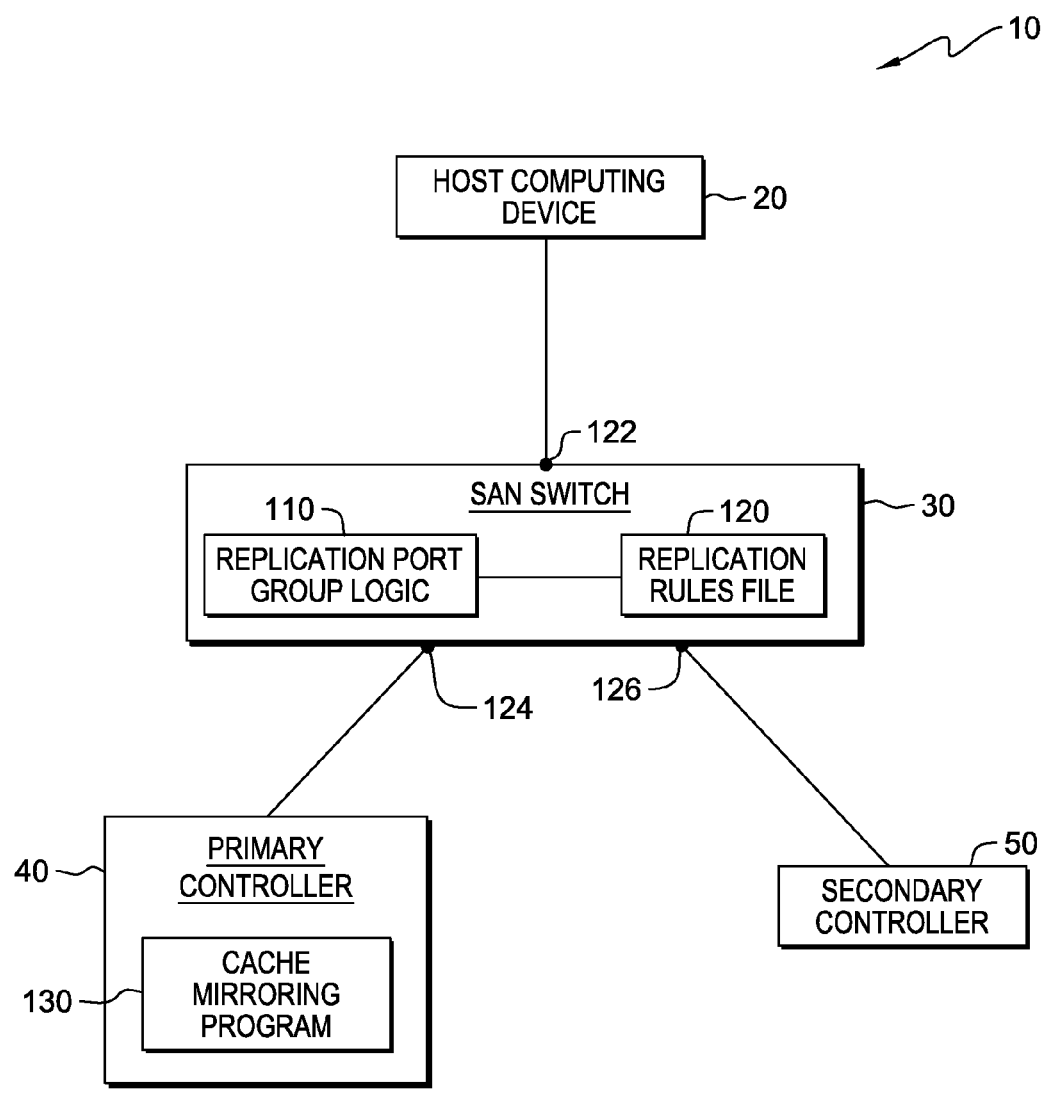
FIG. 1 depicts a diagram of a computing system in accordance with one embodiment of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer-readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

The present invention will now be described in detail with reference to the Figures.

FIG. 1 depicts a diagram of computing system 10 in accordance with one embodiment of the present invention. FIG. 1 provides an illustration of one embodiment and does not imply any limitations with regard to the environments in which different embodiments may be implemented.

In the depicted embodiment, computing system 10 includes host computing device 20, primary controller 40, and secondary controller 50 interconnected through SAN switch 30. Computing system 10 may include additional computing devices, servers, controllers, switches, or other devices not shown.

Host computing device 20 may be a management server, a web server, a desktop computer, laptop computer, netbook computer, tablet computer, personal digital assistant (PDA), or smart phone. In general, host computing device 20 may be any electronic device or computing system capable of sending and receiving data, and communicating with primary controller 40 and secondary controller 50 through SAN switch 30. Host computing device 20 may send data to SAN switch 30 via source port 122. The data that host computing device 20 may send to SAN switch 30 via source port 122 may include packets (including cells), frames, or another format. A packet is a formatted unit of data capable of being routed through a computer network. A packet generally includes at least a header and body containing the message data. The packet header lists the destination of the packet (e.g., the destination IP address), and often indicates the length of the message data. Communication and data transfer between host computing device 20 and SAN switch 30 may utilize various transport layer protocols, such as Internet Small Computer System Interface (iSCSI), Fibre Channel (FC), Fiber Channel over Ethernet (FCoE), or other protocols. A transport layer protocol is a networking protocol that may be used to connect computer data storage or provide end-to-end communication services for applications. Host computing device 20 may send data to SAN switch 30 through the use of software or other applications located on host computing device 20. Host computing device 20 may include components, as depicted and described in further detail with respect to FIG. 4.

SAN switch 30 may be a network switch compatible with transport layer protocols, such as iSCSI, FC, FCoE, or other protocols. SAN switch 30 receives data from a device, such as host computing device 20. SAN switch 30 has at least one source port 122 and may have additional source ports (not shown). SAN switch has at least two destination ports 124 and 126, and may have additional destination ports (not shown) Source port 122, destination port 124, destination port 126, and other switch ports may utilize any of a variety of computer network connections, including wired connections such as 8P8C Ethernet. SAN switch 30 may be wirelessly interconnected with a device, in which case source port 122, destination port 124, destination port 126, and other switch ports (not shown) refer to the wireless network connection between the switch port and the device, and the switch ports include one or more wireless antennas capable of connecting to one or more devices via a wireless network protocol, such as 802.11. The data received via source port 122 or any other downstream switch port (not shown) may be packets (including cells), frames, or another format. Communication and data transfer between SAN switch 30, host computing device 20, primary controller 40, and secondary controller 50 may utilize various transport layer protocols, such as iSCSI, FC, FCoE, or other protocols.

SAN switch 30 contains replication port group logic 110 and replication rules file 120. SAN switch 30 may include components, as depicted and described in further detail with respect to FIG. 4.

Replication port group logic 110 operates to replicate and translate the address or port number of each replicated frame or packet to a new destination according to replication rules in order to send the frames or packets to multiple and separate destinations. Each replication rule may specify the source port, one or more destination ports, and a description of the type of frame or packet to replicate. For example, a replication rule may specify that data frames shall be replicated and sent to second controller 50 via destination port 126 if the frame is received at source port 122 with a destination address of destination port 124. In one embodiment, to process such a request, replication port group logic 110 will look to the header of each incoming frame or packet on the source port and replicate the frame or packet to destination ports as defined by applicable replication rules. In one embodiment, replication port group logic 110 resides on SAN switch 30.

Replication rules file 120 may be a repository that may be written and read by an administrator or user at a computing device, such as host computing device 20. Replication rules file 120 may be accessible to replication port group logic 110. Replication rules file 120 may store replication rules defining frames that need to be replicated from a source port to one or more destination ports. Each replication rule may specify the source port, one or more destination ports, and a description of the type of frame (e.g., data) to replicate. In one embodiment, replication rules file 120 resides on SAN switch 30. In other embodiments, replication rules file 120 may reside on another server or another computing device, provided that replication rules file 120 is accessible to replication port group logic 120.

Primary controller 40 and secondary controller 50 may each be controllers providing a point of control for storage resources, such as a disk array controller or RAID controller that interfaces with host computing device 20 via SAN switch 30. A disk array controller or RAID controller is a device which manages physical disk drives and presents them to a computer as logical units. A disk array controller or RAID controller also often provides additional disk cache. In one embodiment, primary controller 40 and secondary controller 50 are each the same type of controller, or are each controllers that perform substantially the same function. In the current illustration, the designation of primary and secondary is used only for clarity when discussing the destination for frames sent by host computing device 20. In some embodiments, a networking mesh may exist between two or more controllers, such as primary controller 40, secondary controller 50, and other controllers not shown. The networking mesh may allow for communication between controllers outside of and independent from SAN switch 30. In addition, primary controller 40 may send and receive data to and from SAN switch 30 via destination port 124. The data primary controller 40 may receive from SAN switch 30 via destination port 124 may be packets (including cells), frames, or another format. Secondary controller 50 may similarly send and receive data to and from SAN switch 30 via destination port 126. Communication and data transfer between primary controller 40, secondary controller 50, and SAN switch 30 may utilize various transport layer protocols, such as iSCSI, FC, FCoE, or other protocols.

In the depicted embodiment, primary controller 40 contains cache mirroring program 130. In some embodiments, secondary controller 50 may also include cache mirroring program 130. Primary controller 40 and secondary controller 50 may each include components, as depicted and described in further detail with respect to FIG. 4.

Cache mirroring program 130 operates to coordinate WRITE requests between primary controller 40 and one or more secondary controllers, such as secondary controller 50. Cache mirroring program 130 may communicate with secondary controller 50 to determine available buffer space after a WRITE request has been received. In addition, cache mirroring program 130 operates to receive sense data from each secondary controller and return the sense data to host computing device 20. Sense data may indicate the success or failure of the data transfer to the controller. In some embodiments, cache mirroring program 130 may also operate on a secondary controller, such as secondary controller 50, to receive and reply to requests generated by a primary controller, such as primary controller 40, utilizing cache mirroring program 130.

In some embodiments, cache mirroring program 130 communicates with secondary controller 50 across SAN switch 30. In other embodiments, cache mirroring program 130 communicates with secondary controller 50 via a separate communication channel within a networking mesh containing at least primary controller 40 and secondary controller 50. In one embodiment, cache mirroring program 130 resides on primary controller 40. In another embodiment cache mirroring program 130 resides on multiple controllers within computing system 10, such as primary controller 40, secondary controller 50, and other controllers (not shown).

It should be understood that the quantities of elements shown in FIG. 1 are shown for illustration only. For example, SAN switch 30 may include a greater number of switch ports, which may be communicatively connected to a greater number of host computing devices and/or controllers.

Figure 2:
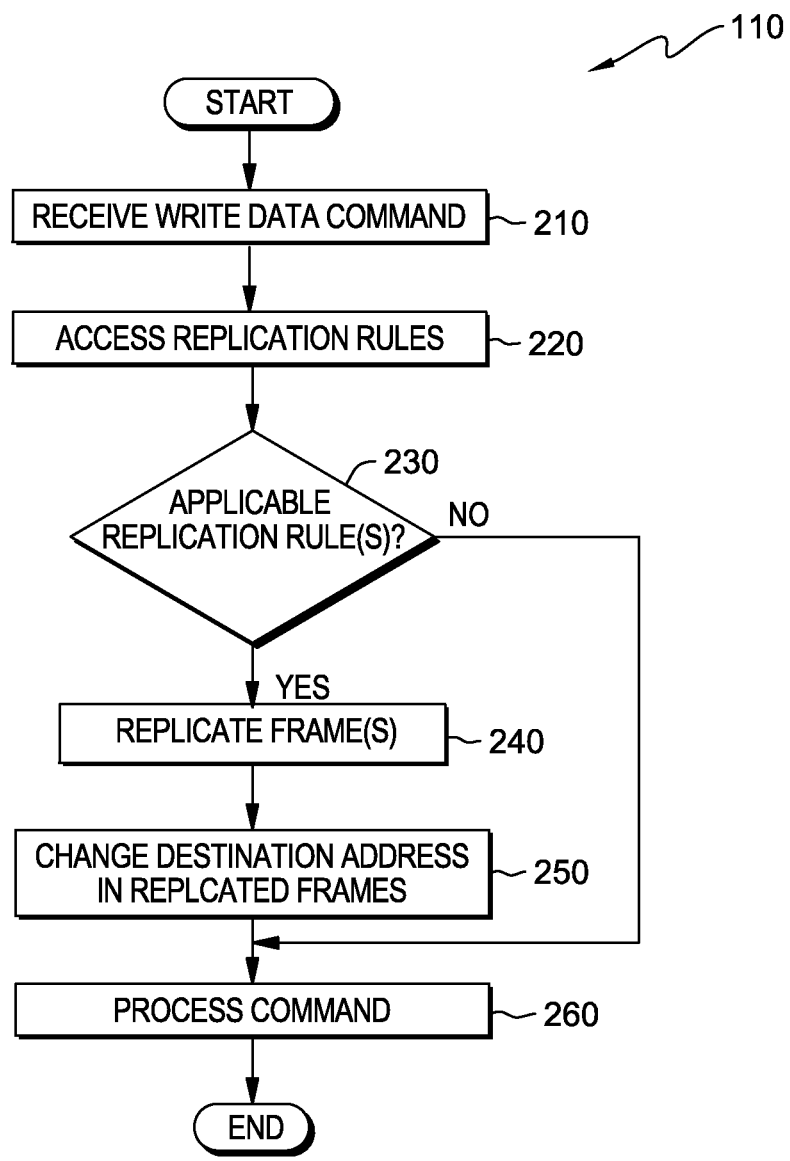
FIG. 2 depicts a flowchart of the steps of a replication port group logic within the computing system of FIG. 1, for replicating and changing the destination address of frames received from a source port, in accordance with one embodiment of the present invention.

FIG. 2 depicts the flowchart of the steps of replication port group logic 110 executing within the computing system of FIG. 1, for replicating received frames and modifying the destination address of replicated frames in order to send the frames to multiple and separate destinations, in accordance with one embodiment of the present invention.

SAN switch 30 may receive a number of commands and frames from host computing devices, such as host computing device 20, and controllers, such as primary controller 40 and secondary controller 50. Replication port group logic 110 may be able to differentiate between different types of commands (e.g., READ, WRITE, REQUEST SENSE, etc.) and frames or packets received. Replication port group logic 110 may be able to differentiate between commands and frames by accessing the header associated with the frame or command, or by looking at other characteristics of the frame or command. The frame header may specify information about the frame, such as the source address, destination address, type of data, and other information.

In step 210, replication port group logic 110 receives a WRITE DATA command. In one embodiment, the WRITE DATA command is generated using the Small Computer System Interface (SCSI) protocol. The WRITE DATA command may be received from SAN switch 30 from an originating host computing device, such as host computing device 20 via source port 122. A WRITE DATA command may include one or more frames that include a header. For example, a WRITE DATA command may be issued from host computing device 20, via source port 122. The WRITE DATA command header may specify a destination address directing the frame(s) to primary controller 40 via destination port 124.

In step 220, replication port group logic 110 accesses one or more replication rules from replication rules file 120. In some embodiments, the one or more replication rules may be a set of default rules. For example, a SAN architecture may be designed to utilize cache mirroring across multiple controllers when a WRITE DATA command is received from a particular port, such as source port 122, with a specified destination address, such as primary controller 40 or destination port 124. In other embodiments, the one or more replication rules may be a customized set of replication rules created by a user for replicating and directing the destination of frames associated with WRITE DATA requests. For example, a user at host computing device 20, or alternatively, with access to SAN switch 30, may specify particular replication rules in order to establish such a method of cache mirroring.

Replication rules may group together a source port and one or more destination ports that require cache mirroring. Replication rules will define the frames that need to be replicated from the source port to the one or more destination ports.

In decision 230, replication port group logic 110 determines whether replication rules, such as replication rules stored to replication rules file 120, are applicable to the received WRITE DATA request and associated frames. In one embodiment, replication port group logic 110 retrieves information from the header of each incoming frame from a source port, such as source port 122, to determine the destination address, type of data, and other information. By comparing this information to replication rules, replication port group logic 110 can determine if there are applicable replication rules.

If replication port group logic 110 determines that there are no applicable replication rules (decision 230, no branch), replication port group logic 110 will process the command (step 260), causing SAN switch 122 to route each frame according to the destination address listed in the frame header. Replication port group logic 110 may determine that there are no applicable replication rules if the destination address does not have an associated replication rule, the type of data is not associated with a replication rule, the source port is not associated with a replication rule, or by other similar means. Once replication port group logic 110 processes the command, the process is complete.

If replication port group logic 110 determines that there are applicable replication rules with respect to a received WRITE DATA command and associated frames (decision 230, yes branch), replication port group logic will cause the associated frames to be replicated according to the replication rules (step 240). Replication port group logic 110 will cause associated frames to be duplicated such that there are enough duplicated frames to route to each required destination address according to applicable replication rules.

In step 250, replication port group logic 110 changes the destination address in each replicated frame to coincide with each required destination address as per applicable replication rules. In one embodiment, replication port group logic 110 may change the destination address in each replicated frame by accessing the header for each frame and changing the location in the header that specifies the destination address for the frame. Replication port group logic 110 may perform this step for each replicated frame.

In step 260, replication port group logic 110 processes the command. Replication port group logic 110 will process the command by causing SAN switch 122 to route each frame according to the destination address listed in the frame header. For each frame, the original frame will be sent to the original destination address, while replicated frames will be sent according to the changed destination address(es). Once replication port group logic 110 has processed each command, the process is complete.

Figure 3:
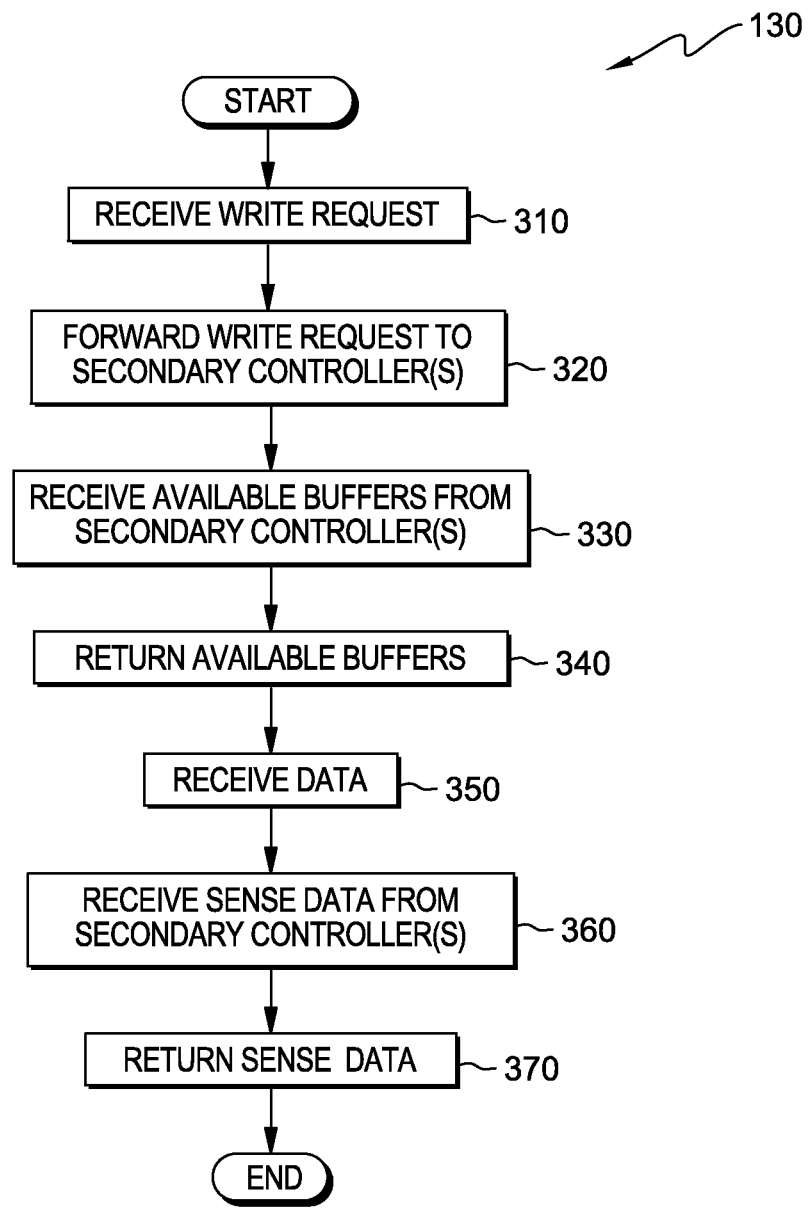
FIG. 3 depicts a flowchart of the steps of a cache mirroring program executing within the computing system of FIG. 1, for coordinating write requests between primary and secondary controllers.

FIG. 3 depicts the flowchart of the steps of cache mirroring program 130 executing within the computing system of FIG. 1, for coordinating WRITE requests between primary and secondary controllers as cache mirroring of data frames occurs, in accordance with one embodiment of the present invention.

In step 310, cache mirroring program 130 receives a WRITE request. In the depicted embodiment, cache mirroring program 130 is located on primary controller 40, and primary controller 40 has received a WRITE request from host computing device 20 via SAN switch 30. In some embodiments, the WRITE request may include a header that specifies secondary controllers for cache mirroring. Typically, the WRITE request will require a response indicating available buffer space before any data is sent to the controller.

In step 320, cache mirroring program 130 forwards the WRITE request to all secondary controllers. In the depicted embodiment, secondary controller 50 is the only secondary controller. In some embodiments, cache mirroring program 130 may forward the WRITE request to secondary controller 50 through SAN switch 30. In other embodiments, primary controller 40 and secondary controller 50 may be communicatively connected via another means, such as a network mesh. In such an embodiment, rather than transferring the WRITE request through SAN switch 30, cache mirroring program 130 may cause the WRITE request to be forwarded to secondary controller 50 directly through alternate channels.

In step 330, cache mirroring program 130 receives information about available buffers from secondary controller(s). In the depicted embodiment, cache mirroring program 130 receives information about available buffers from secondary controller 50. In other embodiments, cache mirroring program 130 may receive information about available buffers from multiple secondary controllers. The information included about the available buffers for a controller indicates the amount of buffer space available to receive data. In some embodiments, cache mirroring program 130 may receive other or additional information from secondary controller(s).

In step 340, cache mirroring program 130 returns a ready to transfer or transfer ready packet to host computing device 20 through SAN switch 30. The transfer ready packet includes information about available buffers. Information about available buffers in the transfer ready packet is determined by the available buffers of primary controller 40, secondary controller 50, and potentially other controllers (not shown). In some embodiments, primary controller 40 may use the information received (see step 330) to determine settings that allow for primary controller 40, secondary controller 50, and other secondary controllers (not shown) and include the information in the ready to transfer or transfer ready packet.

In one embodiment, cache mirroring program 130 returns a transfer ready packet to host computing device 20 indicating that primary controller 40 can receive a packet of data that is a size that is at most equal to the smaller of an available buffer space on primary controller 40, or an available buffer space on secondary controller 50. For example, primary controller 40 may be capable of receiving 32 KB of data, while secondary controller 50 is only capable of receiving 16 KB of data. In such an example, cache mirroring program 130 will return a transfer ready packet indicating available buffer space of 16 KB.

In step 350, cache mirroring program 130 receives data. In some embodiments, cache mirroring program 130 will merely receive an indication that primary controller 40 is receiving or has received data. Secondary controller 50 will also receive the same data as per the replication and routing process of replication port group logic 110 on SAN switch 122. Once all of the data has been received, cache mirroring program 130 will wait until sense data has been received from all secondary controllers.

In step 360, cache mirroring program 130 receives sense data from secondary controllers. In the depicted embodiment, cache mirroring program 130 will receive sense data from secondary controller 50. Sense data may include information as to success or failure of the data transfer with respect to the controller from which the information was generated. In some embodiments sense data will travel through SAN switch 30. In other embodiments sense data will be received via an alternate communication method, such as a line of communication created by a network mesh between primary controller 40, secondary controller 50, and other controllers (not shown). Once all sense data has been received from each secondary controller (e.g., secondary controller 50) involved in the cache mirroring process, cache mirroring program 130 returns sense data indicating success or failure of the data transfer to host computing device 20 through SAN switch 30 (step 370). If the sense data indicates success of the data transfer, the process is complete. If the sense data indicates failure of the data transfer, host computing device 20 may take the necessary steps to attempt to resend the data, or alternatively, a user at host computing device 20 may be notified of the data transfer failure.

Figure 4:
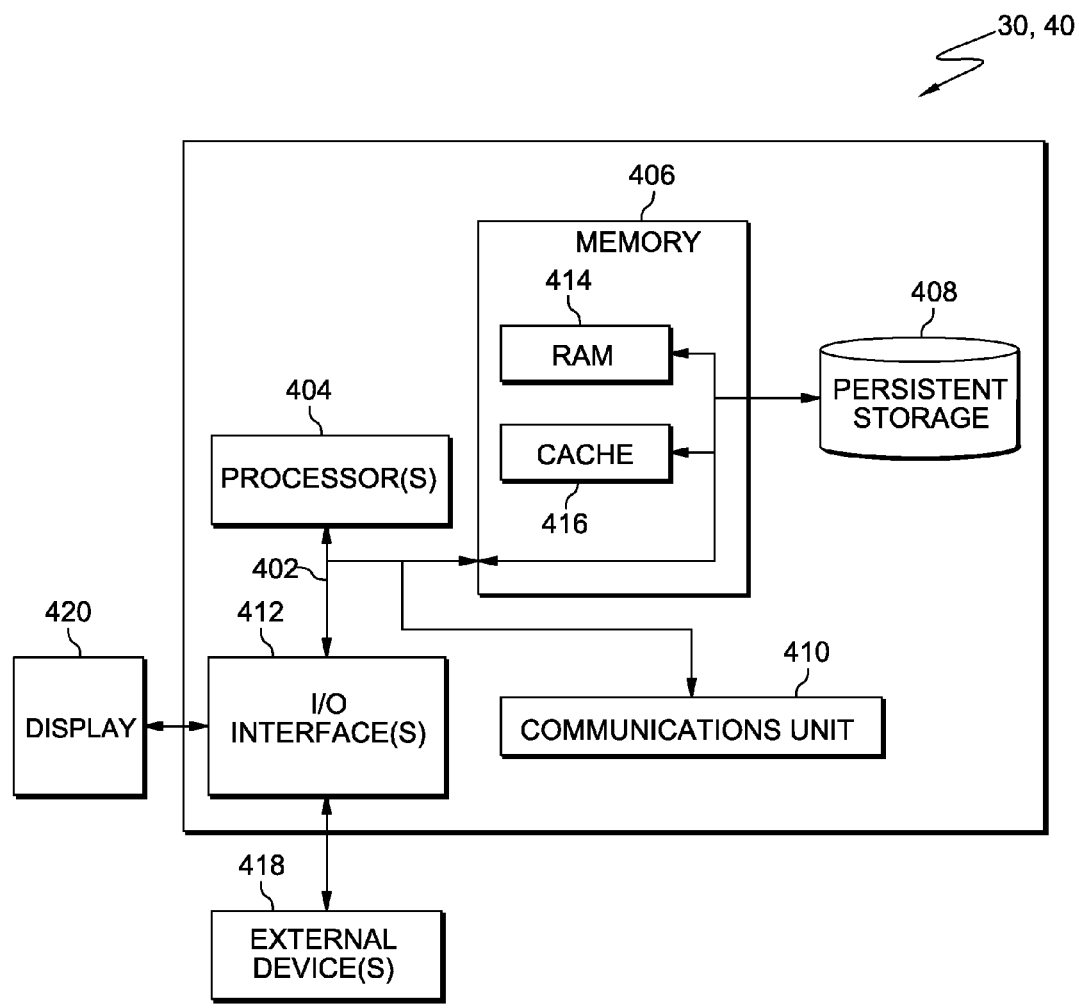
FIG. 4 depicts a block diagram of components of a computing system in accordance with an embodiment of the present invention.

FIG. 4 depicts a block diagram of components of SAN switch 30 and primary controller 40 in accordance with an illustrative embodiment of the present invention. FIG. 4 may also depict a block diagram of components of host computing device 20 and secondary controller 50. It should be appreciated that FIG. 4 provides only an illustration of one implementation and does not imply any limitations with regard to the environments in which different embodiments may be implemented. Many modifications to the depicted environment may be made.

SAN switch 30 and primary controller 40 each include communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer-readable storage media. In this embodiment, memory 406 includes random access memory (RAM) 414 and cache memory 416. In general, memory 406 can include any suitable volatile or non-volatile computer-readable storage media.

Replication port group logic 110 and replication rules file 120 are stored in persistent storage 408 of SAN switch 30 for execution and/or access by one or more of the respective computer processors 404 of SAN switch 30 via one or more memories of memory 406 of SAN switch 30. Cache mirroring program 130 is stored in persistent storage 408 of primary controller 40 for execution by one or more of the respective computer processors 404 of primary controller 40 via one or more memories of memory 406 of primary controller 40. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer-readable storage medium that is also part of persistent storage 408.

Communications unit 410, in these examples, provides for communications with other data processing systems or devices. In these examples, communications unit 410 includes one or more network interface cards. Communications unit 410 may provide communications through the use of either or both physical and wireless communications links. Replication port group logic 110 and replication rules file 120 may be downloaded to persistent storage 408 of SAN switch 30 through communications unit 410 of SAN switch 30. Cache mirroring program 130 may be downloaded to persistent storage 408 of primary controller 40 through communications unit 410 of primary controller 40.

I/O interface(s) 412 allows for input and output of data with other devices that may be connected to SAN switch 30 and/or primary controller 40. For example, I/O interface 412 may provide a connection to external devices 418 such as a keyboard, keypad, a touch screen, and/or some other suitable input device. External devices 418 can also include portable computer-readable storage media such as, for example, thumb drives, portable optical or magnetic disks, and memory cards. Software and data used to practice embodiments of the present invention, e.g., replication port group logic 110 and replication rules file 120, can be stored on such portable computer-readable storage media and can be loaded onto persistent storage 408 of SAN switch 30 via I/O interface(s) 412 of SAN switch 30. Software and data used to practice embodiments of the present invention, e.g., cache mirroring program 130, can be stored on such portable computer-readable storage media and can be loaded onto persistent storage 408 of primary controller 40 via I/O interface(s) 412 of primary controller 40. I/O interface(s) 412 also connect to a display 420.

Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for replicating data, the method comprising:
   a first controller receiving a request to write data from a device;
   the first controller communicating with a second controller to obtain information necessary for the second controller to receive the data;
   the first controller determining settings that allow for the first controller and the second controller to each receive the data using the information necessary for the second controller to receive the data;
   the first controller sending the settings that allow for the first controller and the second controller to each receive the data to the device;
   the first controller changing a destination address in the data to allow for the first controller and the second controller to each receive the data to the device, and the first controller receiving the data sent from the device to the first controller and the second controller based on the settings and changing the destination address that allow for the first controller and the second controller to each receive the data, wherein the settings that allow for the first controller and the second controller to each receive the data includes sending the data in one or more packets, wherein each packet is a size that is at most equal to the smaller of an available buffer space on the second controller or an available buffer space on the first controller.

2. The method of claim 1, wherein the information necessary for the second controller to receive the data includes available buffer space on the second controller.

3. The method of claim 1, wherein the step of the first controller receiving the data sent from the device to the first controller and the second controller based on the settings that allow for the first controller and the second controller to each receive the data comprises:

the first controller receiving the data sent from the device to the first controller and second controller based on the settings that allow for the first controller and the second controller to each receive the data through a first port of a storage area network (SAN) switch communicatively connected to the device, the first controller, and the second controller.

4. The method of claim 3, wherein the data sent from the device to the first controller and the second controller based on the settings that allow for the first controller and the second controller to each receive the data is sent from the device to the SAN switch, replicated within the SAN switch according to at least a rule, and sent to the first controller and the second controller.

5. The method of claim 4, wherein the rule specifies a source port, at least one destination port, and a description of the type of packet to replicate.

6. The method of claim 1, further comprising:

the first controller receiving sense data from the second controller, wherein the sense data indicates the data sent from the device to the first controller and the second controller based on the settings that allow for the first controller and the second controller to each receive the data was received by the second controller; and the first controller returning sense data from the first controller and the sense data from the second controller to the device.

7. A computer program product stored in a non-transitory computer readable storage medium for replicating data, the computer program product comprising:

one or more non-transitory computer-readable storage media and program instructions stored on the one or more computer-readable storage media, the program instructions comprising:

program instructions to receive, by a first controller, a request to write data from a device;

program instructions to communicate, by the first controller, with a second controller to obtain information necessary for the second controller to receive the data;

program instructions to determine, by the first controller, settings that allow for the first controller and the second controller to each receive the data using the information necessary for the second controller to receive the data;

program instructions to send, by the first controller, the settings that allow for the first controller and the second controller to each receive the data to the device;

program instructions to change, by the first controller, a destination address in the data to allow for the first controller and the second controller to each receive the data to the device; and program instructions to receive, by the first controller, the data sent from the device to the first controller and the second controller based on the settings and changing the destination address that allow for the first controller and the second controller to each receive the data, wherein the settings that allow for the first controller and the second controller to each receive the data includes sending the data in one or more packets, wherein each packet is a size that is at most equal to the smaller of an available buffer space on the second controller or an available buffer space on the first controller.

8. The computer program product of claim 7, wherein the information necessary for the second controller to receive the data includes available buffer space on the second controller.

9. The computer program product of claim 7, wherein program instructions to receive, by the first controller, the data sent from the device to the first controller and the second controller based on the settings that allow for the first controller and the second controller to each receive the data comprises:

program instructions to receive, by the first controller, the data sent from the device to the first controller and second controller based on the settings that allow for the first controller and the second controller to each receive the data through a first port of a storage area network (SAN) switch communicatively connected to the device, the first controller, and the second controller.

10. The computer program product of claim 9, wherein the data sent from the device to the first controller and the second controller based on the settings that allow for the first controller and the second controller to each receive the data is sent from the device to the SAN switch, replicated within the SAN switch according to at least a rule, and sent to the first controller and the second controller.

11. The computer program product of claim 10, wherein the rule specifies a source port, at least one destination port, and a description of the type of packet to replicate.

12. The computer program product of claim 7, further comprising:

program instructions, stored on the one or more computer-readable storage media, to receive, by the first controller, sense data from the second controller, wherein the sense data indicates the data sent from the device to the first controller and the second controller based on the settings that allow for the first controller and the second controller to each receive the data was received by the second controller; and program instructions, stored on the one or more computer-readable storage media, to return, by the first controller, sense data from the first controller and the sense data from the second controller to the device.

13. A computer system for replicating data, the computer system comprising:

one or more computer processors, one or more non-transitory computer-readable storage media, and program instructions stored on the computer-readable storage media for execution by at least one of the one or more processors, the program instructions comprising:

program instructions to receive, by a first controller, a request to write data from a device;

program instructions to communicate, by the first controller, with a second controller to obtain information necessary for the second controller to receive the data;

program instructions to determine, by the first controller, settings that allow for the first controller and the second controller to each receive the data using the information necessary for the second controller to receive the data;

program instructions to send, by the first controller, the settings that allow for the first controller and the second controller to each receive the data to the device;

program instructions to change, by the first controller, a destination address in the data to allow for the first controller and the second controller to each receive the data to the device; and program instructions to receive, by the first controller, the data sent from the device to the first controller and the second controller based on the settings and changing the destination address that allow for the first controller and the second controller to each receive the data, wherein the settings that allow for the first controller and the second controller to each receive the data includes sending the data in one or more packets, wherein each packet is a size that is at most equal to the smaller of an available buffer space on the second controller or an available buffer space on the first controller.

14. The computer system of claim 13, wherein the information necessary for the second controller to receive the data includes available buffer space on the second controller.

15. The computer system of claim 13, wherein program instructions to receive, by the first controller, the data sent from the device to the first controller and the second controller based on the settings that allow for the first controller and the second controller to each receive the data comprises:

program instructions to receive, by the first controller, the data sent from the device to the first controller and second controller based on the settings that allow for the first controller and the second controller to each receive the data through a first port of a storage area network (SAN) switch communicatively connected to the device, the first controller, and the second controller.

16. The computer system of claim 15, wherein the data sent from the device to the first controller and the second controller based on the settings that allow for the first controller and the second controller to each receive the data is sent from the device to the SAN switch, replicated within the SAN switch according to at least a rule, and sent to the first controller and the second controller.

17. The computer system of claim 13, further comprising:

program instructions, stored on the computer-readable storage media for execution by at least one of the one or more processors, to receive, by the first controller, sense data from the second controller, wherein the sense data indicates the data sent from the device to the first controller and the second controller based on the settings that allow for the first controller and the second controller to each receive the data was received by the second controller; and program instructions, stored on the computer-readable storage media for execution by at least one of the one or more processors, to return, by the first controller, sense data from the first controller and the sense data from the second controller to the device.

* * * * *